United States Patent
Nagasawa (10) Patent No.: US 11,872,952 B2
(45) Date of Patent: Jan. 16, 2024

(54) COLLISION DAMAGE REDUCTION DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/986,438

(22) Filed: Nov. 14, 2022

(65) Prior Publication Data

US 2023/0158866 A1 May 25, 2023

(30) Foreign Application Priority Data

Nov. 24, 2021 (JP) .................................. 2021-190146

(51) Int. Cl.
| | |
|---|---|
| *B60R 21/36* | (2011.01) |
| *B60R 21/233* | (2006.01) |
| *B60R 21/00* | (2006.01) |
| *B60R 21/21* | (2011.01) |
| *B60J 5/04* | (2006.01) |

(52) U.S. Cl.
CPC .............. *B60R 21/36* (2013.01); *B60R 21/00* (2013.01); *B60R 21/21* (2013.01); *B60R 21/233* (2013.01); *B60J 5/0429* (2013.01); *B60J 5/0456* (2013.01)

(58) Field of Classification Search
CPC ....... B60R 21/36; B60R 21/21; B60R 21/233; B60J 5/0456; B60J 5/0461
See application file for complete search history.

(56) References Cited

U.S. PATENT DOCUMENTS

| | | | | |
|---|---|---|---|---|
| 6,883,631 B2* | 4/2005 | Hu | .................. | B60R 21/013 |
| | | | | 180/274 |
| 7,806,221 B2* | 10/2010 | Mishra | ................... | B60R 21/013 |
| | | | | 280/730.1 |
| 8,172,027 B2* | 5/2012 | Mishra | ................... | B60R 19/205 |
| | | | | 280/730.1 |
| 9,452,666 B1* | 9/2016 | Suh | ................... | B60R 19/42 |
| 10,434,970 B2* | 10/2019 | Saito | ................... | B60R 21/21 |
| 11,072,307 B1* | 7/2021 | Baccouche | ............ | B60R 19/205 |

(Continued)

FOREIGN PATENT DOCUMENTS

| | | | | | |
|---|---|---|---|---|---|
| CN | 103158653 A | * | 6/2013 | ............ | B60R 19/205 |
| CN | 113147656 A | * | 7/2021 | .......... | B60R 21/0134 |

(Continued)

*Primary Examiner* — Nicole T Verley
(74) *Attorney, Agent, or Firm* — MCGINN I.P. LAW GROUP, PLLC.

(57) ABSTRACT

A collision damage reduction device to be applied to a vehicle provided with a door and a side sill includes an airbag and a door beam. The airbag is deployed from a container disposed on a lower side of the door to a region on a vehicle-widthwise outside of the door. The airbag includes a first air chamber and a second air chamber. After being deployed, the first air chamber has an upper end disposed higher than the door beam and a lower end disposed lower than an upper end of the side sill, at least within a range in which its position in a vehicle front-rear direction overlaps with a seating surface of a seat. The second air chamber extends across a lower part of the first air chamber and the container, and has a lower internal pressure than the first air chamber after being deployed.

6 Claims, 9 Drawing Sheets

(56) References Cited

U.S. PATENT DOCUMENTS

| | | | |
|---|---|---|---|
| 11,299,020 B2 * | 4/2022 | Honda | B62D 25/14 |
| 2003/0155750 A1 * | 8/2003 | Hu | B60R 21/013 |
| | | | 280/730.1 |
| 2004/0049331 A1 * | 3/2004 | Schneider | B60R 19/205 |
| | | | 701/45 |
| 2011/0204679 A1 * | 8/2011 | Deng | B60J 5/0461 |
| | | | 296/187.12 |
| 2014/0062068 A1 * | 3/2014 | Suesada | B60R 21/0428 |
| | | | 296/187.05 |
| 2015/0258878 A1 * | 9/2015 | Sugiyama | B60J 5/0448 |
| | | | 49/505 |
| 2015/0352929 A1 * | 12/2015 | Brar | B60J 5/0462 |
| | | | 296/187.12 |
| 2016/0355152 A1 * | 12/2016 | Perez Garcia | B60R 21/34 |
| 2017/0072775 A1 * | 3/2017 | Kindaichi | B60R 21/0136 |
| 2017/0246936 A1 * | 8/2017 | Takagai | B60J 5/0456 |
| 2018/0023156 A1 * | 1/2018 | Khutorsky | C21D 9/08 |
| | | | 428/586 |

FOREIGN PATENT DOCUMENTS

| | | | | |
|---|---|---|---|---|
| DE | 10203287 A1 | * | 8/2003 | B60R 21/013 |
| EP | 2894067 A1 | * | 7/2015 | B60R 21/21 |
| EP | 3015298 A2 | * | 5/2016 | B60J 5/0437 |
| EP | 3333022 A1 | * | 6/2018 | B60J 5/0444 |
| JP | H061027 U | * | 1/1994 | |
| JP | 2005-537165 A | | 12/2005 | |
| JP | 2005537165 A | * | 12/2005 | |
| JP | 2008-526593 A | | 7/2008 | |
| JP | 2011189843 A | * | 9/2011 | |
| JP | 6740168 B2 | | 8/2020 | |
| JP | 2021017202 A | * | 2/2021 | B60J 5/042 |
| JP | 2023039538 A | * | 3/2023 | B60R 21/36 |
| KR | 20140087556 A | | 7/2014 | |
| KR | 20190040745 A | * | 4/2019 | |
| KR | 2071711 B1 | * | 1/2020 | B60J 5/0415 |
| WO | WO-03053748 A1 | * | 7/2003 | B60R 19/205 |
| WO | WO-2014129335 A1 | * | 8/2014 | B60J 5/0429 |
| WO | WO-2015090582 A1 | * | 6/2015 | B60R 21/21 |

* cited by examiner

COLLISION DAMAGE REDUCTION DEVICE

CROSS-REFERENCE TO RELATED APPLICATIONS

The present application claims priority from Japanese Patent Application No. 2021-190146 filed on Nov. 24, 2021, the entire contents of which are hereby incorporated by reference.

BACKGROUND

The disclosure relates to a collision damage reduction device that is applicable to a vehicle and reduces damage to a vehicle body upon a side collision.

For example, in a vehicle such as an automobile, use of an airbag device including an airbag to be deployed outside the vehicle has been proposed to reduce damage to a vehicle body and an occupant inside the vehicle body upon a collision.

As techniques related to measures against a side collision of a vehicle, for example, Japanese Unexamined Patent Application Publication (Translation of PCT Application) (JP-T) No. 2005-537165 discloses an airbag to be deployed along an outer surface of a door on a side surface of a vehicle body. The airbag is positioned, in a vehicle front-rear direction, to extend from a front pillar to a center pillar, and the inside of the airbag is divided into chambers in the front-rear direction.

JP-T No. 2008-526593 discloses than, in a vehicle outside airbag device that suppresses damage to a vehicle body, airbags arranged in a front-rear direction along a vehicle side surface are deployed.

Japanese Patent No. 6740168 discloses that an airbag is deployed to the vehicle-widthwise outside from an impact beam, i.e., a door beam, disposed to extend in a front-rear direction inside a door.

SUMMARY

An aspect of the disclosure provides a collision damage reduction device to be applied to a vehicle. The vehicle is provided with a door and a side sill. The door is provided to be openable and closable at a door opening provided on a side surface of a vehicle body of the vehicle. The side sill is disposed along a lower edge of the door. The collision damage reduction device includes an airbag and a door beam. The airbag is configured to be deployed from a container to be disposed on a lower side of the door on the vehicle body to a region on a vehicle-widthwise outside of the door. The door beam is to be disposed across a front part and a rear part inside the door. The airbag includes a first air chamber and a second air chamber. The first air chamber is configured to, after being deployed, have an upper end disposed at a higher position than the door beam and a lower end disposed at a lower position than an upper end of the side sill, at least within a range in which a position of the first air chamber in a vehicle front-rear direction overlaps with a seating surface of a seat for an occupant. The second air chamber is configured to extend across a lower part of the first air chamber and the container, and have a lower internal pressure than the first air chamber after being deployed.

An aspect of the disclosure provides a collision damage reduction device to be applied to a vehicle. The vehicle is provided with a door and a side sill. The door is provided to be openable and closable at a door opening provided on a side surface of a vehicle body of the vehicle. The side sill is disposed along a lower edge of the door. The collision damage reduction device includes an airbag and a door beam. The airbag is configured to be deployed from a container to be disposed on a lower side of the door on the vehicle body to a region on a vehicle-widthwise outside of the door. The door beam is to be disposed across a front part and a rear part inside the door and inclined to allow a front end of the door beam to be positioned higher than a rear end of the door beam. The door beam includes a moment generator configured to, in response to a load applied from the vehicle-widthwise outside, generate a moment that rotates the door beam in a direction in which an upper part of the door beam is displaced to a vehicle-widthwise inside with respect to a lower part of the door beam. The airbag is configured to transmit a load in a vehicle-widthwise inward direction to the moment generator upon collision of the vehicle with an object.

An aspect of the disclosure provides a collision damage reduction device to be applied to a vehicle. The vehicle is provided with a door and a side sill. The door is provided to be openable and closable at a door opening provided on a side surface of a vehicle body of the vehicle. The side sill is disposed along a lower edge of the door. The collision damage reduction device includes an airbag and a door beam. The airbag is configured to be deployed from a container to be disposed on a lower side of the door on the vehicle body to a region on a vehicle-widthwise outside of the door. The door beam is to be disposed across a front part and a rear part inside the door and inclined to allow a front end of the door beam to be positioned higher than a rear end of the door beam. The door beam includes a moment generator configured to, in response to a load applied from the vehicle-widthwise outside, generate a moment that rotates the door beam in a direction in which a lower part of the door beam is displaced to a vehicle-widthwise inside with respect to an upper part of the door beam. The airbag is configured to transmit a load in a vehicle-widthwise inward direction to the moment generator upon collision of the vehicle with an object. The door includes an internal structure configured to come into contact with the moment generator as a result of the rotation of the door beam.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In a side collision in which an object, such as another vehicle, collides from a side of a vehicle, a crash stroke in which energy is absorbable by crush of a vehicle body structure is shorter than in a front collision, which can result in an insufficient amount of energy absorption.

Moreover, in a side collision, a deformation speed of a door during the collision can be faster than a movement speed of a vehicle body, which can cause secondary collision damage to an occupant.

In view of such circumstances, for example, the following existing techniques may be used: a technique of preventing deformation of a door by increasing its bending strength by installing a door beam inside the door, across pillar structures provided in front of and behind the door; and a technique of adding a catcher mechanism at a lower end of a door to prevent the door from entering the inside of a vehicle compartment beyond a side sill. However, these techniques can be unable to sufficiently suppress collision damage, for example, in a case where an object that collides from a side has a high speed or a large mass.

It is desirable to provide a collision damage reduction device that suppresses collision damage upon a side collision.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A description is given below of a collision damage reduction device according to a first example embodiment of the disclosure.

The collision damage reduction device according to the first example embodiment may be related to a vehicle, for example, an automobile such as a passenger car, provided with an occupant entry and exit door on a side surface of a vehicle compartment that accommodates an occupant.

Figure 1:
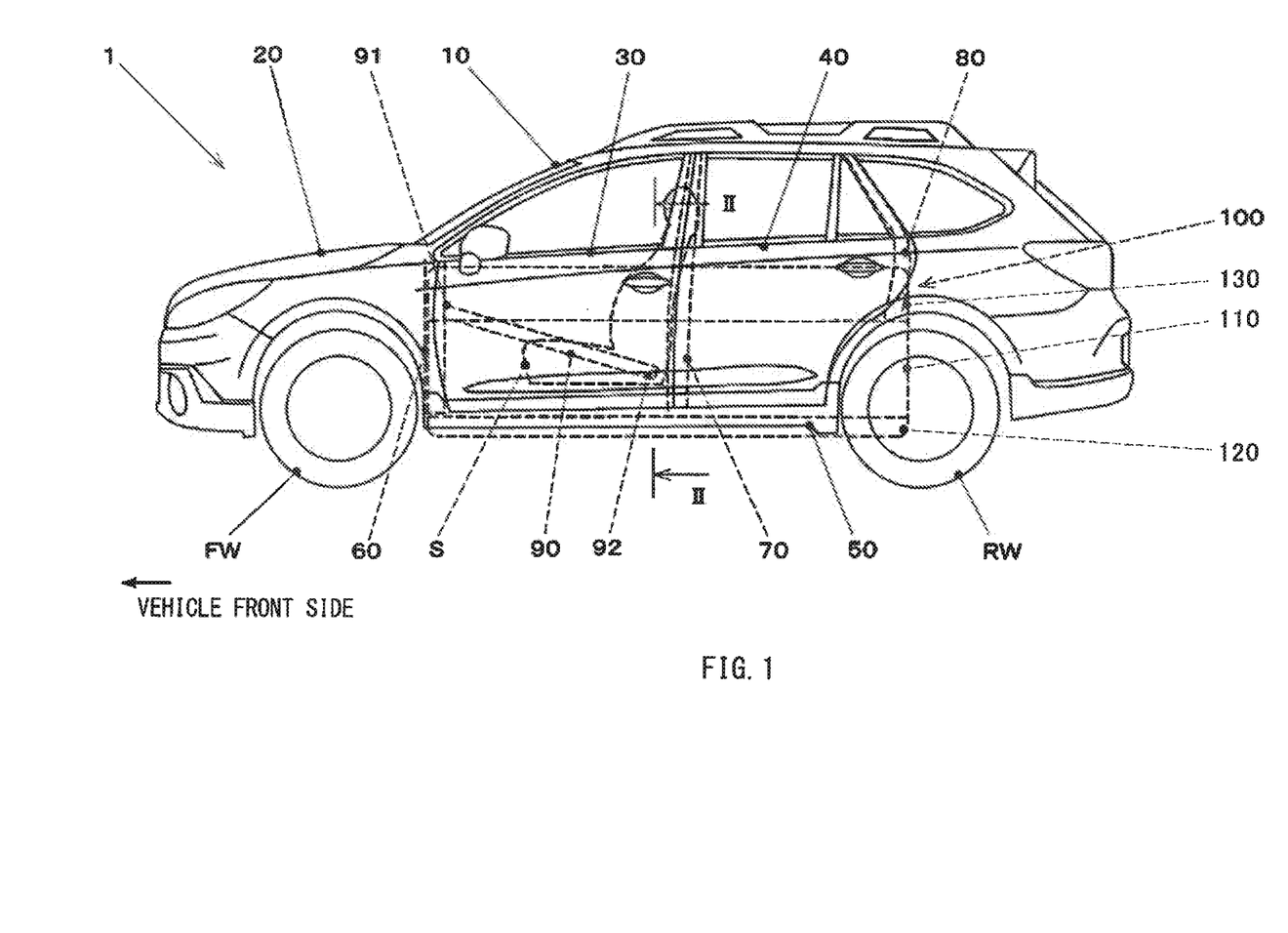
FIG. 1 is a side view of a vehicle including a collision damage reduction device according to one example embodiment of the disclosure.

FIG. 1 is a side view of the vehicle including the collision damage reduction device according to the first example embodiment.

Figure 2:
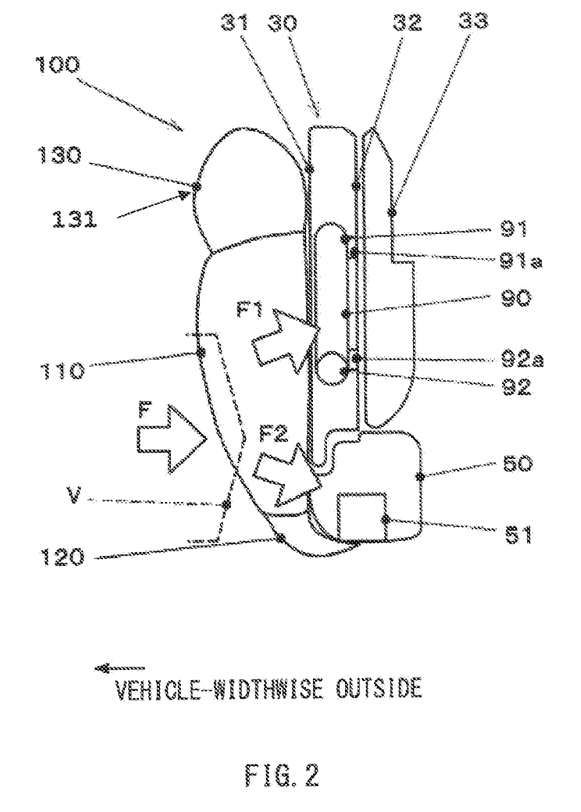
FIG. 2 is a cross-sectional view taken in a direction of arrows II-II illustrated in FIG. 1.

FIG. 2 is a cross-sectional view taken in a direction of arrows II-II illustrated in FIG. 1.

Figure 3:
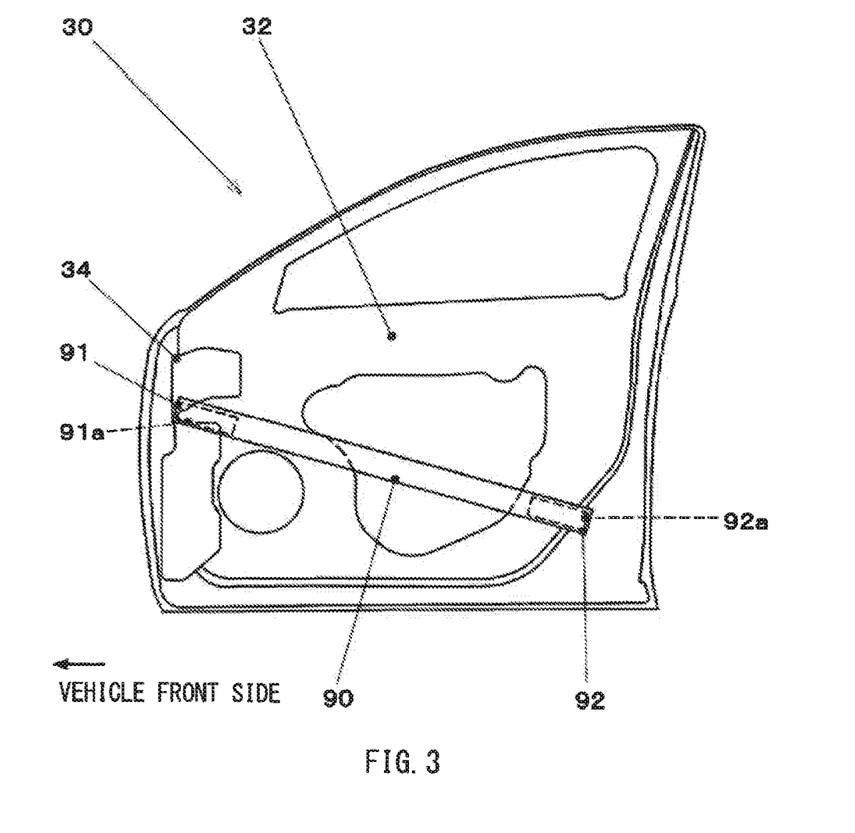
FIG. 3 is a schematic side view of a front side door in the vehicle according to one example embodiment.

FIG. 3 is a schematic side view of a front side door in the vehicle according to the first example embodiment.

Note that, in FIG. 3, an outer panel 31 to be described later is omitted, or transparent, for easier understanding.

In the first example embodiment, a vehicle 1 may be, for example, an automobile such as a passenger car with a so-called two-box vehicle shape that includes a power unit compartment 20 protruding to a front side of a vehicle compartment 10.

The vehicle compartment 10 may have a space that accommodates, for example, an occupant. The vehicle compartment 10 may include, for example, two rows of seats, i.e., front seats and rear seats, arranged in a front-rear direction.

A side surface of the vehicle compartment 10 may be provided with, for example, a front side door 30, a rear side door 40, a side sill 50, an A pillar 60, a B pillar 70, a C pillar 80, and a door beam 90.

The front side door 30 may be a door-shaped body that is used for a front-seat occupant to get in or get out of the vehicle. The front side door 30 may be provided to be openable and closable at a door opening provided on a side of a front seat S in a front part of the vehicle compartment 10.

The front side door 30 may have a front end swingably attached to a rear part of the A pillar 60 via an unillustrated hinge.

The front side door 30 may have a rear end detachably attached to a front part of the B pillar 70 via an unillustrated door catch mechanism.

As illustrated in FIG. 2, the front side door 30 may include, for example, the outer panel 31, an inner panel 32, and a door trim 33.

The outer panel 31 and the inner panel 32 may each be, for example, a steel plate press-worked into a panel-shaped member.

The outer panel 31 may be a member included in an outer surface, or a design surface, of the vehicle 1.

The inner panel 32 may be disposed on the vehicle-widthwise inside of the outer panel 31.

The outer panel 31 and the inner panel 32 may be joined to each other at outer peripheral edges. In a middle part of the front side door 30, the outer panel 31 and the inner panel 32 may be opposed to each other with a space provided therebetween in a vehicle widthwise direction.

The inner panel 32 may be a frame-shaped member including a steel plate with a larger thickness than the outer panel 31 and having higher strength and bending stiffness than the outer panel 31.

In one embodiment, the inner panel 32 may serve as an "internal structure".

The door trim 33 may be an interior member exposed to the inside of the vehicle compartment 10.

The door trim 33 may be attached to a surface of the inner panel 32 on the vehicle-widthwise inside.

The door trim 33 may include, for example, a resin-based material such as polypropylene (PP).

The rear side door 40 may be a door-shaped body that is used for a rear-seat occupant to get in or get out of the vehicle. The rear side door 40 may be provided to be openable and closable at a door opening provided on a side of an unillustrated rear seat in a rear part of the vehicle compartment 10.

A front edge of the rear side door 40 may be disposed adjacent to a rear edge of the front side door 30 via an inevitably provided space or gap, in a state in which the doors are closed.

The rear side door 40 may have a front end swingably attached to a rear part of the B pillar 70 via an unillustrated hinge.

The rear side door 40 may have a rear end detachably attached to a front part of the C pillar 80 via an unillustrated door catch mechanism.

The side sill 50 may be a vehicle body structural member extending in the front-rear direction of the vehicle, i.e., a vehicle front-rear direction, along lower edges of the front side door 30 and the rear side door 40.

The side sill 50 may be disposed along both ends of an unillustrated floor panel included in a floor surface of the vehicle compartment 10.

The side sill 50 may have a front end disposed adjacent to a rear part of a front wheel house containing a front wheel FW.

The side sill 50 may have a rear end disposed adjacent to a front part of a rear wheel house containing a rear wheel RW.

A lower part of the side sill 50 may be provided with a retainer 51 serving as a container that contains an airbag 100 in an undeployed state and an inflator 211.

The retainer 51 may serve as a part where the deployed airbag 100 is attached on a vehicle body side.

The A pillar 60 may be a vehicle body structural member, i.e., a front pillar, provided to protrude upward from the vicinity of the front end of the side sill 50.

A lower part of the A pillar 60 may be disposed along the front end of the front side door 30.

The lower part of the A pillar 60 may be provided with the unillustrated hinge supporting the front side door 30 swingably about an axis extending along a vertical direction.

An upper part of the A pillar 60 may be exposed to be included in the outer surface of a vehicle body of the vehicle, and may be inclined rearward along a side edge of a windshield.

The B pillar 70 may be a vehicle body structural member, i.e., a center pillar, provided to protrude upward from an intermediate part of the side sill 50 in the front-rear direction.

The rear edge of the front side door 30 may be disposed along a front part of the B pillar 70.

The rear end of the front side door 30 may be detachably attached to the B pillar 70 via the unillustrated door catch mechanism.

The front edge of the rear side door 40 may be disposed along a rear part of the B pillar 70.

The rear part of the B pillar 70 may be provided with the unillustrated hinge supporting the rear side door 40 swingably about an axis extending along the vertical direction.

The C pillar 80 may be a vehicle body structural member, i.e., a rear pillar, provided to protrude upward from the vicinity of the rear end of the side sill 50.

A rear edge of the rear side door 40 may be disposed along a front part of the C pillar 80.

The rear end of the rear side door 40 may be detachably attached to the C pillar 80 via the unillustrated door catch mechanism.

The side sill 50, the A pillar 60, the B pillar 70, and the C pillar 80 may be, for example, steel plates press-formed into panels and assembled and joined by spot welding, laser welding, a structural adhesive, etc. to each have a closed section as a cross-section extending along a plane orthogonal to a longitudinal direction.

The door beam 90 is a member provided inside the front side door 30 and disposed across a front part and a rear part of the front side door 30.

The door beam 90 may include, for example, a circular pipe including a steel material.

As illustrated in FIG. 3, a front end 91 of the door beam 90 may be, in the vicinity of the front end of the front side door 30, attached to the inner panel 32 via a stiffener (reinforcement) 34.

The front end 91 may be fixed to the inner panel 32 and the stiffener 34 via a connector 91a, for example, by welding or a mechanical fastening mechanism such as a bolt and a nut.

A rear end 92 of the door beam 90 may be attached to the inner panel 32 in the vicinity of the rear end of the front side door 30.

The rear end 92 may be fixed to the inner panel 32 via a connector 92a, for example, by welding or a mechanical fastening mechanism such as a bolt and a nut.

The door beam 90 may be inclined with respect to a horizontal direction in such a manner that the front end 91 is positioned higher than the rear end 92.

The vehicle 1 may include the airbag 100 configured to be deployed to a region on the vehicle-widthwise outside of the front side door 30 and the rear side door 40, in response to a symptom of a side collision (establishment of pre-crash determination).

The airbag 100 may be, for example, base fabric panels including nylon fibers joined to each other into a bag-shaped body by a method such as stitching or fusion.

The airbag 100 may be deployed by receiving a deployment gas introduced from the inflator 211 to be described later.

In normal use of the vehicle, including before pre-crash determination establishment and before airbag deployment, the airbag 100 may be contained in a folded state in the retainer 51 provided in the lower part of the side sill 50.

As illustrated in FIG. 2 etc., the airbag 100 may include a first air chamber 110, a second air chamber 120, and a third air chamber 130.

The first air chamber 110 may be deployed on the vehicle-widthwise outside of the outer panel 31 and the side sill 50.

The first air chamber 110 may be configured to mainly transmit a load received from an object that comes into side collision to the door beam 90 and the side sill 50.

As illustrated in FIG. 1, in the side view of the vehicle, an upper end of the first air chamber 110 is disposed to be positioned above an upper end of the door beam 90, and a lower end of the first air chamber 110 is disposed to be positioned below an upper end of the side sill 50, in a region from a front end to a rear end of a seating surface of the seat S in the vehicle front-rear direction. Note that such a positional relationship may hold, for example, in the entire region of a front-rear sliding range of the seat S.

The second air chamber 120 is a part provided across a lower part of the first air chamber 110 and the retainer 51 of the side sill 50 and included in a lower part of the airbag 100.

The second air chamber 120 may be configured to couple the first air chamber 110 and the side sill 50, and control a behavior of the first air chamber 110.

The control of the behavior of the first air chamber 110 by the second air chamber 120 will be described in detail later.

The third air chamber 130 may be a part configured to be deployed to protrude further to the upper side from an upper part of the first air chamber 110.

The third air chamber 130 may be provided with a vent hole (vent channel) 131.

The third air chamber 130 may be configured to, upon receiving a load applied by collision with an object (e.g., another vehicle), contract while exhausting the deployment gas to the outside from the vent hole 131 to absorb energy caused by the collision.

The third air chamber 130 may serve as an energy absorption (EA) airbag that generates a uniform load on a contact surface with the outer panel 31 of the front side door 30, in response to load application.

As illustrated in FIG. 1, a front end of the airbag 100 may be positioned to protrude to a vehicle front side further than the front end of the front side door 30.

A rear end of the airbag 100 may be positioned to protrude to a vehicle rear side further than the rear end of the rear side door 40.

Figure 4:
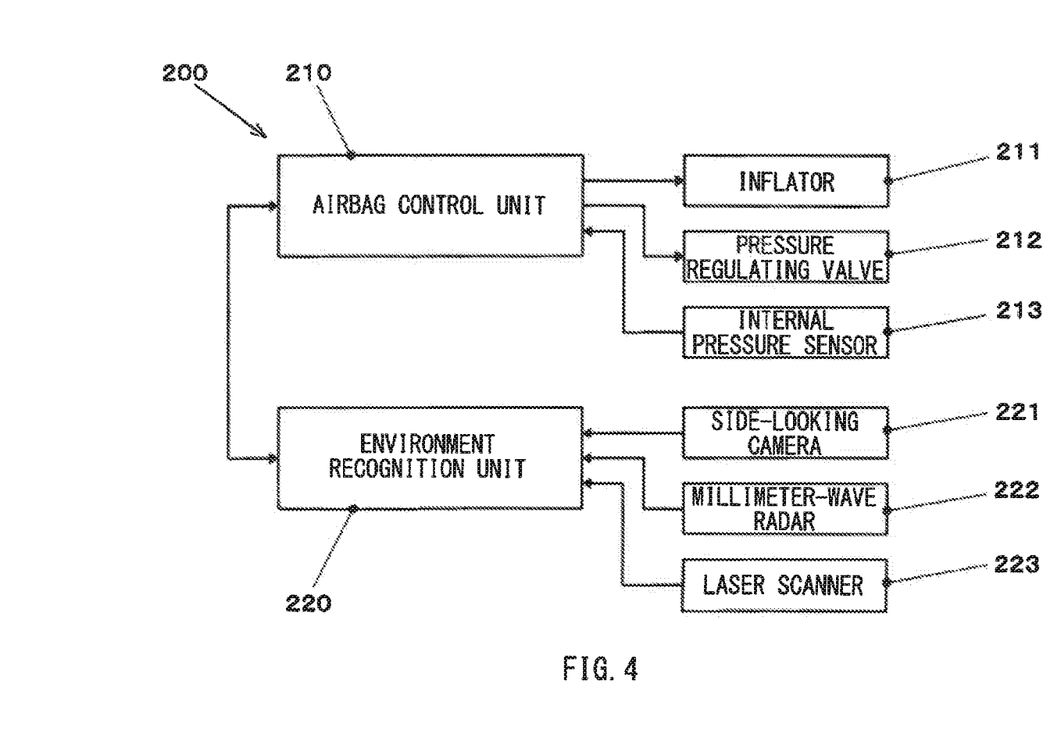
FIG. 4 is a diagram illustrating a configuration of a control system for an airbag in the collision damage reduction device according to one example embodiment.

FIG. 4 is a diagram illustrating a configuration of a control system for the airbag in the collision damage reduction device according to the first example embodiment.

A control system 200 may include, for example, an airbag control unit 210 and an environment recognition unit 220.

The airbag control unit 210 and the environment recognition unit 220 may each include a microcomputer including, for example, a data processor, a storage, an input/output interface, and a bus. The data processor may be a central processing unit (CPU). The storage may be a random-access memory (RAM) or a read-only memory (ROM). The bus may couple the data processor, the storage, and the input/output interface together.

The airbag control unit 210 and the environment recognition unit 220 may be communicably coupled to each other, for example, directly or via an in-vehicle local area network (LAN) such as a controller area network (CAN) communication system.

The airbag control unit 210 may control a deployment state of the airbag 100.

The airbag control unit 210 may be coupled to, for example, the inflator 211, a pressure regulating valve 212, and an internal pressure sensor 213.

The inflator 211 may be a gas generator that deploys the airbag 100 by supplying the deployment gas to each of the first air chamber 110, the second air chamber 120, and the third air chamber 130 of the airbag 100.

The inflator 211 may be configured to generate the deployment gas, for example, by causing a chemical to react in response to a deployment signal.

The inflator 211 may have a configuration including multiple gas generators that supply the deployment gas independently to the first air chamber 110, the second air chamber 120, and the third air chamber 130 of the airbag 100.

In another example, the inflator 211 may be a multistage inflator that is able to generate the deployment gas multiple times at time intervals, on an as-needed basis.

The pressure regulating valve 212 may be provided in the second air chamber 120, and may open and close an unillustrated vent channel that allows communication between the inside and the outside.

The pressure regulating valve 212 may be configured to, in response to a valve-opening command from the airbag control unit 210, open the vent channel and release the deployment gas inside the second air chamber 120 to the outside to reduce an internal pressure of the second air chamber 120.

The internal pressure sensor 213 may be a pressure sensor that detects the pressure (i.e., internal pressure) of the deployment gas inside the second air chamber 120.

The environment recognition unit 220 may recognize a surrounding environment including a side of the vehicle 1, i.e., the own vehicle, on the basis of outputs of various sensors.

The environment recognition unit 220 may be coupled to the sensors, for example, a side-looking camera 221, a millimeter-wave radar 222, and a laser scanner 223.

The side-looking camera 221 may include, for example, a solid-state image sensor such as a complementary metal oxide semiconductor (CMOS) or a charge-coupled device (CCD), an imaging optical system such as a lens group, and an image processor. The side-looking camera 221 may sequentially acquire images within an imaging range, i.e., an angle of view, including the side of the own vehicle.

The millimeter-wave radar 222 may be a radar that uses radio waves in a frequency band of, for example, 30 to 300 GHz. The millimeter-wave radar 222 may be configured to detect presence or absence of an object and a relative position of the object with respect to the vehicle 1.

The laser scanner 223 may be a light detection and ranging (LiDAR). The laser scanner 223 may be configured to irradiate surroundings of the vehicle 1 with, for example, pulsed near-infrared laser light to scan the surroundings. The laser scanner 223 may thereby detect, for example, presence or absence of an object, a relative position of the object with respect to the vehicle 1, and a shape of the object, on the basis of presence or absence of reflected light and a time difference between irradiation with the laser light and returning of reflected light.

For example, in a case where a side collision with an object such as another vehicle V is unavoidable, i.e., a case where pre-crash determination is established, the environment recognition unit 220 may be able to recognize a form of the collision with the object and an attribute of the object. The form of the collision with the object may be, for example, a speed vector of the object with respect to the vehicle 1 or a position where the object collides with the vehicle 1. The attribute of the object may be, for example, a vehicle type, a vehicle shape, or a size in a case where the object is a vehicle.

In a case where the environment recognition unit 220 detects a symptom of collision of an object on a side of the vehicle 1 (e.g., the front side door 30 and a region around the front side door 30), the environment recognition unit 220 may establish pre-crash determination, and inform the airbag control unit 210 that the pre-crash determination has been established.

In response to the establishment of the pre-crash determination by the environment recognition unit 220, the airbag control unit 210 may cause the inflator 211 to generate the deployment gas to deploy the airbag 100.

At this time, an internal pressure of the first air chamber 110 may be set to be a relatively higher pressure than those of the second air chamber 120 and the third air chamber 130.

The first air chamber 110 may be configured to, when an object collides from the vehicle-widthwise outside, transmit an applied load F to the door beam 90 and the side sill 50 in a distributed manner.

To allow the first air chamber 110 to perform the above operation, the second air chamber 120 may be configured to control a behavior of the airbag 100 being deployed to cause the airbag 100 to be deployed along the outer panel 31 of the front side door 30.

While the airbag 100 is being deployed, the internal pressure of the second air chamber 120 may be set to a predetermined during-deployment internal pressure by closing the pressure regulating valve 212.

This makes it possible to increase shape stability of the second air chamber 120, making it possible to guide the first air chamber 110 to a position along the outer panel 31, prior to collision with an object such as the other vehicle V.

After the object collides with the first air chamber 110, for example, and transmission of a load F1 from the first air chamber 110 to the front side door 30 (including the door beam 90), and transmission of a load F2 from the first air chamber 110 to the side sill 50 are started, the pressure regulating valve 212 may be opened, and the internal pressure of the second air chamber 120 may decrease from the during-deployment internal pressure described above.

This softens the second air chamber 120, preventing the second air chamber 120 from inhibiting the behavior when the first air chamber 110 transmits the loads to the door beam 90 and the side sill 50.

In addition, the third air chamber 130 may, upon receiving a load applied from the object, contract by releasing the deployment gas to the outside from the vent hole 131 to thereby absorb energy caused by the collision.

According to the first example embodiment described above, it is possible to achieve the following example effects.

(1) When an object such as the other vehicle V comes into side collision with the vehicle 1, it is possible to transmit the load F applied from the object to the first air chamber 110 of the airbag 100 in a distributed manner as the load F1 on the door beam 90 and the load F2 on the side sill 50, at least within a range in which a position of the first air chamber 110 in the front-rear direction overlaps with the seating surface of the seat S. This makes it possible to suppress a secondary collision between the door trim 33 and an occupant due to deformation of the front side door 30 at an early stage of the collision.

It also is possible to prevent the front side door 30 from thereafter entering the inside of the vehicle compartment 10 beyond the side sill 50, making it possible to keep survival space for the occupant.

Moreover, the second air chamber 120 configured to have a lower internal pressure than the first air chamber 110 is provided across the lower part of the first air chamber 110 and the retainer 51 serving as an attachment part on the vehicle body side. This makes it possible to promote deformation of the airbag 100 to allow the first air chamber 110 to be positioned to be able to transmit loads to the door beam 90 and the side sill 50 upon collision with an object. This helps to more effectively achieve the example effects described above.

(2) The third air chamber 130 may be provided to protrude to the upper side of the first air chamber 110 and to release the deployment gas in response to collision with an object. This makes it possible to absorb collision energy applied above the first air chamber 110 upon the collision with the object by contraction of the third air chamber 130, making it possible to suppress deformation of the front side door 30 above the first air chamber 110.

Second Example Embodiment

A description is given next of a collision damage reduction device according to a second example embodiment of the disclosure.

In example embodiments described below, portions similar to those in the foregoing example embodiment are denoted with the same reference numerals to avoid repetitive description, and differences will mainly be described.

Figure 5:
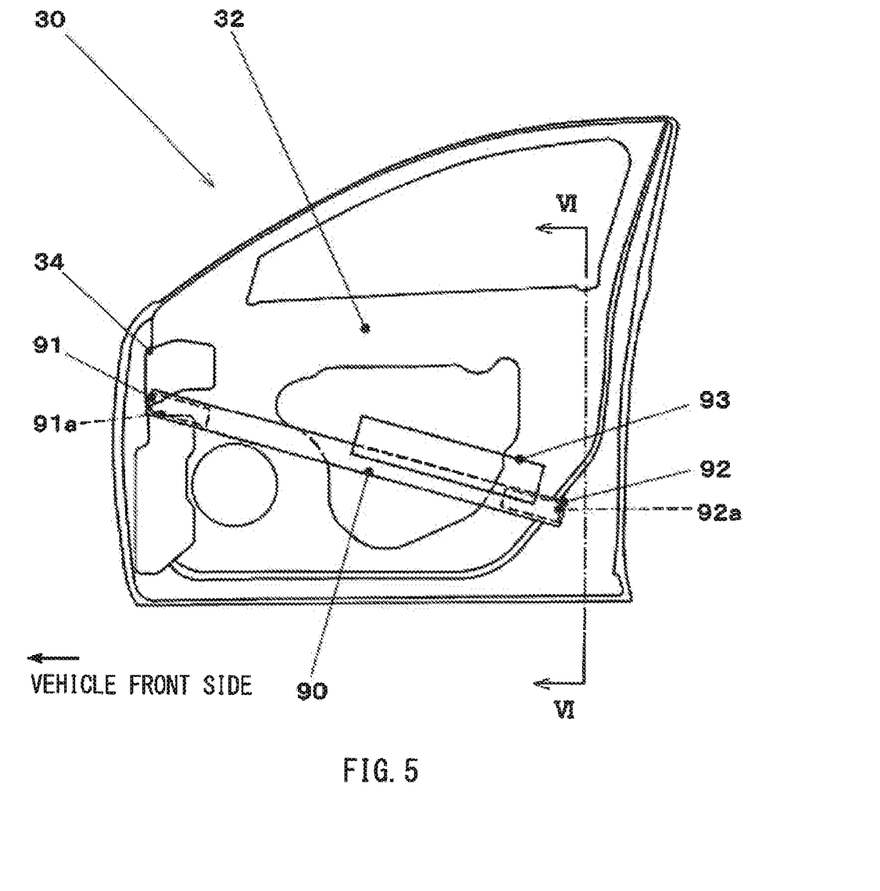
FIG. 5 is a schematic side view of a front side door in a vehicle including a collision damage reduction device according to one example embodiment of the disclosure.
Figure 6:
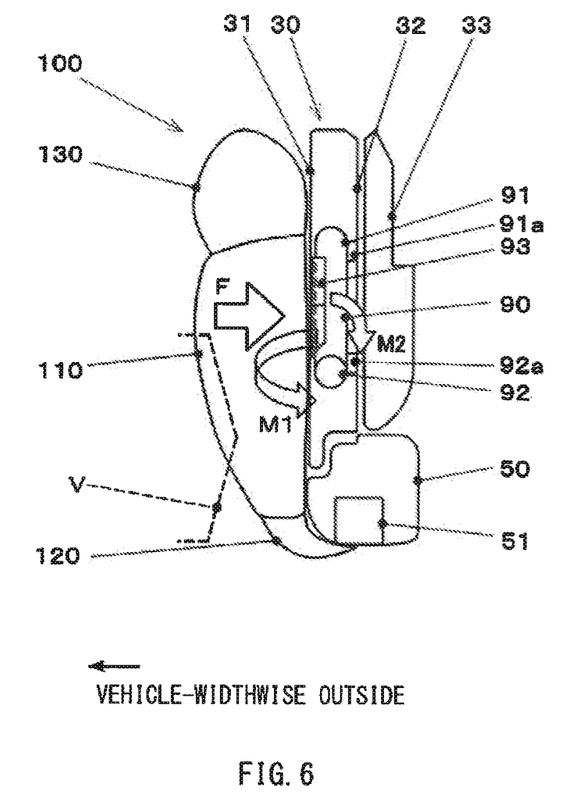
FIG. 6 is a cross-sectional view taken in a direction of arrows VI-VI illustrated in FIG. 5.

FIG. 5 is a schematic side view of the front side door in the vehicle including the collision damage reduction device according to the second example embodiment of the disclosure. Note that FIG. 5 illustrates portions corresponding to those in FIG. 3 of the first example embodiment. The same applies to FIG. 7 to be described later. FIG. 6 is a cross-sectional view taken in a direction of arrows VI-VI illustrated in FIG. 5.

As in the first example embodiment, in a configuration in which the door beam 90 is inclined in such a manner that the front end is positioned higher than the rear end, in a case where the load F from the vehicle-widthwise outside to the vehicle-widthwise inside is applied to an intermediate part of the door beam 90, a moment M1 may be generated as illustrated in FIG. 6. The moment M1 may rotate (twist) the door beam 90 about an axis extending along its longitudinal direction in a direction in which its lower part is displaced to the vehicle-widthwise inside with respect to its upper part.

In contrast, in the second example embodiment, the door beam 90 may be provided with a moment generator 93 described below.

When a load is applied from the vehicle-widthwise outside via the airbag 100 and the outer panel 31 upon a side collision with an object such as another vehicle, the moment generator 93 may generate a moment M2 that rotates the door beam 90 about the axis extending along its longitudinal direction, i.e., a straight line coupling the front end 91 and the rear end 92, in a direction in which its upper part is displaced to the vehicle-widthwise inside with respect to its lower part.

The moment M2 may be a rotation moment in an opposite direction to the moment M1 described above, and may suppress rotation (torsional deformation) of the door beam 90 caused by the moment M1.

The moment generator 93 may be, for example, a plate-shaped member including a steel plate with larger strength and bending stiffness than another member such as the outer panel 31. The moment generator 93 may be disposed to protrude upward from a surface (i.e., an outer peripheral surface) of the door beam 90 on the vehicle-widthwise outside.

As illustrated in FIG. 5, the moment generator 93 may have a rectangular plan shape, for example, in the side view of the vehicle.

A long-side direction of the rectangle may extend along the longitudinal direction of the door beam 90.

A rear part of the moment generator 93 may partly be positioned, in the vehicle front-rear direction, to overlap with the connector 92a at the rear end 92 of the door beam 90.

A front part of the moment generator 93 may be positioned, in the vehicle front-rear direction, to be apart from the connector 91a at the front end 91 of the door beam 90.

According to the second example embodiment described above, it is possible to achieve example effects similar to those of the first example embodiment described above. In addition, the moment generator 93 generates the moment M2 in the opposite direction to the moment M1 generated by the door beam 90 itself. This makes it possible to suppress rotation (torsional deformation) of the door beam 90, and increase reaction force of the door beam 90 against a load due to collision.

In addition, the rear part of the moment generator 93 may be disposed to overlap with the connector 92a where the door beam 90 is fixed to the inner panel 32. This makes it possible to promote load transmission from the moment generator 93 to the structure of the front side door 30, and increase resistance of the moment generator 93, making it possible to promote the example effects described above.

Third Example Embodiment

Figure 7:
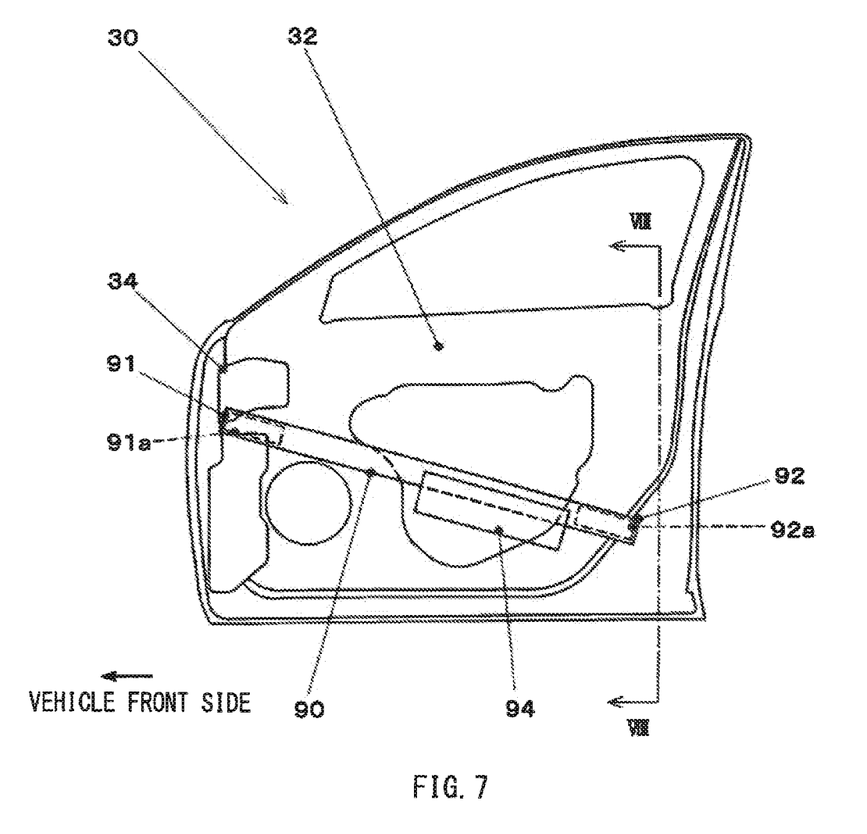
FIG. 7 is a schematic side view of a front side door in a vehicle including a collision damage reduction device according to one example embodiment of the disclosure.

A description is given next of a collision damage reduction device according to a third example embodiment of the disclosure, FIG. 7 is a schematic side view of the front side door in the vehicle including the collision damage reduction device according to the third example embodiment of the disclosure.

Figure 8:
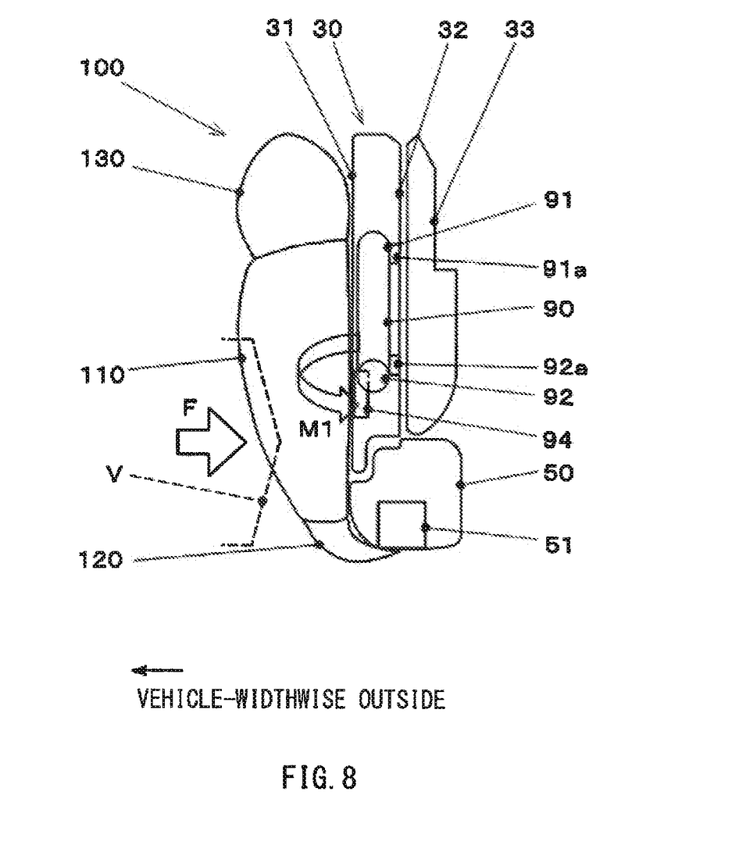
FIG. 8 is a cross-sectional view taken in a direction of arrows VIII-VIII illustrated in FIG. 7.

FIG. 8 is a cross-sectional view taken in a direction of arrows VIII-VIII illustrated in FIG. 7.

In the third example embodiment, a moment generator 94 described below may be provided in place of the moment generator 93 in the second example embodiment.

The moment generator 94 may be configured to, when the load F is applied from the vehicle-widthwise outside via the airbag 100 and the outer panel 31 upon a side collision with an object such as another vehicle, boost the moment M1 that rotates the door beam 90 about the axis extending along its longitudinal direction in the direction in which its lower part is displaced to the vehicle-widthwise inside with respect to its upper part.

The moment generator 94 may be, for example, a plate-shaped member including a steel plate with larger strength and bending stiffness than another member such as the outer panel 31. The moment generator 94 may be disposed to protrude downward from the surface of the door beam 90 on the vehicle-widthwise outside.

As illustrated in FIG. 7, the moment generator 94 may have a rectangular plan shape, for example, in the side view of the vehicle.

A long-side direction of the rectangle may extend along the longitudinal direction of the door beam 90.

A front end and a rear end of the moment generator 94 may be positioned, in the vehicle front-rear direction, to be apart from the connector 91a at the front end 91 of the door beam 90 and the connector 92a at the rear end 92 of the door beam 90, respectively.

Figure 9:
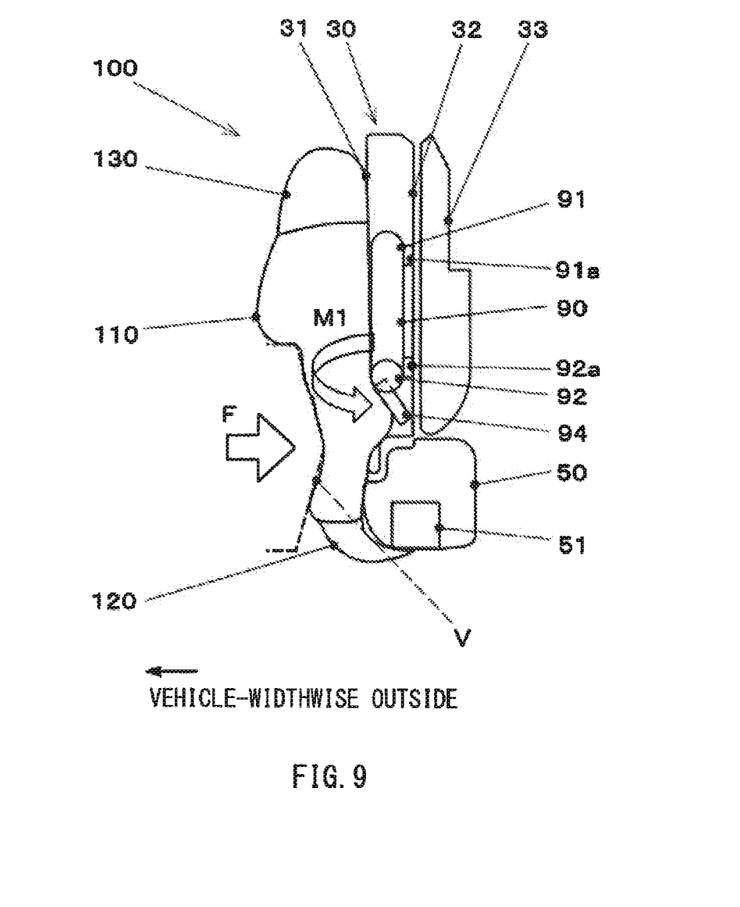
FIG. 9 is a cross-sectional view of the front side door after a side collision in the vehicle including the collision damage reduction device according to one example embodiment.

FIG. 9 is a cross-sectional view of the front side door after a side collision in the vehicle including the collision damage reduction device according to the third example embodiment.

In a case where an object such as the other vehicle V comes into side collision from the vehicle-widthwise outside, the load F may be transmitted to the front side door 30 and the side sill 50 via mainly the first air chamber 110 of the airbag 100.

The load applied to the front side door 30 may be transmitted to the door beam 90 and the moment generator 94 while deforming the outer panel 31.

If the load is transmitted to the door beam 90 and the moment generator 94, the moment M1 described above may be generated to rotate the door beam 90 in the direction in which its lower part is displaced to the vehicle-widthwise inside with respect to its upper part.

At this time, a lower end of the moment generator 94 may come into contact with a surface of the inner panel 32, which is a relatively strong internal structure in the front side door 30, to transmit the load applied to the door beam 90, for example, to the inner panel 32.

The load transmitted to the inner panel 32 may be transmitted to a member such as the B pillar 70 via the unillustrated door catch mechanism, for example.

According to the third example embodiment described above, it is possible to achieve example effects similar to those of the first example embodiment described above. In addition, in a case where a load to the vehicle-widthwise inside is applied to the door beam 90 by collision, when the door beam 90 rotates in the direction in which its lower part is displaced to the vehicle-widthwise inside with respect to its upper part, the moment generator 94 comes into contact with the inner panel 32 serving as the internal structure. This makes it possible to promote load transmission from the door beam 90 to the inner panel 32, making it possible to increase the reaction force of the door beam 90.

The moment generator 94 itself promotes such rotation of the door beam 90, making it possible to effectively achieve the example effects described above.

Moreover, deformation of the door beam 90 and a surrounding part such as the inner panel 32 caused by the rotation of the door beam 90 makes it possible to absorb energy caused by the collision.

The positions of the front end and the rear end of the moment generator 94 in the vehicle front-rear direction may be apart from the connectors 91a and 92a where the door beam 90 is strongly fixed to the inner panel 32. This helps to prevent the rotation of the door beam 90 from being inhibited by restraining force of the connectors 91a and 92a, making it possible to effectively achieve the example effects described above.

MODIFICATION EXAMPLES

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) Configurations of the collision damage reduction device and the vehicle may be changed as appropriate, without being limited to the example embodiments described above.

For example, shapes, structures, materials, manufacturing methods, numbers, arrangements, etc. of the members included in the collision damage reduction device and the vehicle may be changed as appropriate.

(2) A configuration of the airbag, an arrangement of the air chambers, etc. may be changed as appropriate, without being limited to the configurations according to the example embodiments. For example, the third air chamber may be omitted in a case where energy absorption at an upper part of the door is possible by another method. Another air chamber may be additionally provided in addition to the air chambers described above. Each air chamber may be further divided.

(3) A method of detecting a symptom of collision may be changed as appropriate without being limited to the method using the sensors in the example embodiments. For example, another type of sensor may be used in addition to or in place of the sensors in the example embodiments. In another example, a symptom of collision may be detected by inter-vehicle communication or road-to-vehicle communication.

(4) A configuration of the moment generator may be changed as appropriate, without being limited to the configurations according to the second and third example embodiments.

For example, in the example embodiments, the moment generator may include the plate-shaped member attached to the outer surface of the door beam with a straight pipe shape. However, the moment generator may be integrated with a portion of the door beam.

For example, the door beam and the moment generator may be formed as a one-piece member by assembling and joining press-worked sheet metal members by welding, for example, or by a forming method such as hydroforming. The door beam and the moment generator may include, for example, a composite material such as a carbon-fiber reinforced resin.

In another example, the door beam itself may be curved to cause the door beam to partly serve as the moment generator.

(5) In the example embodiments, the container, e.g., the retainer 51, that contains the undeployed airbag 100 may be provided inside the lower part of the side sill 50. However, a place where the container is provided may be changed as appropriate, without being limited thereto. For example, the container may be provided on an underside of the floor panel, or inside a side step, which is an aerodynamic part with design provided on the side sill.

As described above, according to at least one embodiment of the disclosure, it is possible to provide a collision damage reduction device that suppresses collision damage upon a side collision.

Each of the airbag control unit 210 and the environment recognition unit 220 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the airbag control unit 210 and the environment recognition unit 220. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of The airbag control unit 210 and the environment recognition unit 220 illustrated in FIG. 4.

The invention claimed is:

1. A collision damage reduction device to be applied to a vehicle, the vehicle being provided with
    a door provided to be openable and closable at a door opening provided on a side surface of a vehicle body of the vehicle, and
    a side sill disposed along a lower edge of the door, the collision damage reduction device comprising:
    an airbag configured to be deployed from a container to be disposed on a lower side of the door on the vehicle body to a region on a vehicle-widthwise outside of the door; and
    a door beam to be disposed across a front part and a rear part inside the door, wherein the airbag comprises a first air chamber, a second air chamber and a third air chamber,
the first air chamber is configured to, after being deployed, have an upper end disposed at a higher position than the door beam and a lower end disposed at a lower position than an upper end of the side sill, within a range that is, in a vehicle front-rear direction, rearward of a front end of a seating surface of a seat for an occupant and forward of a rear end of the seating surface,
the second air chamber is configured to extend across and below a lower part of the first air chamber and the container within the range, and have a lower internal pressure than the first air chamber after being deployed, and
the third air chamber is configured to protrude above the upper end of the first air chamber within the range, and have a lower internal pressure than the first air chamber after being deployed.

2. The collision damage reduction device according to claim 1, wherein the door beam is inclined to allow a front end of the door beam to be positioned higher than a rear end of the door beam and comprises a moment generator configured to, in response to a load applied from the vehicle-widthwise outside, generate a moment that rotates the door beam in a direction in which an upper part of the door beam is displaced to a vehicle-widthwise inside with respect to a lower part of the door beam, and
    the airbag is configured to transmit a load in a vehicle-widthwise inward direction to the moment generator upon collision of the vehicle with an object.

3. The collision damage reduction device according to claim 1, wherein the door beam is inclined to allow a front end of the door beam to be positioned higher than a rear end of the door beam and comprises a moment generator configured to, in response to a load applied from the vehicle-widthwise outside, generate a moment that rotates the door beam in a direction in which a lower part of the door beam is displaced to a vehicle-widthwise inside with respect to an upper part of the door beam,
    the airbag is configured to transmit a load in a direction to the moment generator upon collision of the vehicle with an object, and
    the door comprises an internal structure configured to come into contact with the moment generator as a result of the rotation of the door beam.

4. The collision damage reduction device according to claim 1, wherein the airbag comprises a vent hole that communicates between an inside of the third air chamber and an outside of the airbag.

5. The collision damage reduction device according to claim 2, wherein the moment generator is disposed to overlap with a connector where the door beam is fixed to an inner panel of the door.

6. The collision damage reduction device according to claim 5, wherein the door beam consists of a circular pipe, and
    wherein the moment generator consists of a plate-shaped member with larger strength and bending stiffness than an outer panel of the door and is disposed to protrude upward from an outer surface of the door beam on the vehicle-widthwise outside.

* * * * *